United States Patent
Lasson et al.

(10) Patent No.: US 9,428,060 B2
(45) Date of Patent: Aug. 30, 2016

(54) METHOD FOR CONTROLLING A HYBRID VEHICLE ELECTRICAL SYSTEM

(71) Applicant: VOLVO TRUCK CORPORATION, Göteborg (SE)

(72) Inventors: Anders Lasson, Göteborg (SE); Jerker Lennevi, Lerum (SE); Henrik Engdahl, Lindome (SE)

(73) Assignee: Volvo Lastvagnar AB, Gothenburg (SE)

( * ) Notice: Subject to any disclaimer, the term of this patent is extended or adjusted under 35 U.S.C. 154(b) by 62 days.

(21) Appl. No.: 14/411,558

(22) PCT Filed: Jul. 3, 2013

(86) PCT No.: PCT/EP2013/001953
§ 371 (c)(1),
(2) Date: Dec. 29, 2014

(87) PCT Pub. No.: WO2014/005705
PCT Pub. Date: Jan. 9, 2014

(65) Prior Publication Data
US 2015/0321657 A1    Nov. 12, 2015

Related U.S. Application Data

(60) Provisional application No. 61/667,975, filed on Jul. 4, 2012.

(51) Int. Cl.
*B60L 3/04* (2006.01)
*B60L 1/00* (2006.01)
(Continued)

(52) U.S. Cl.
CPC .................. *B60L 3/04* (2013.01); *B60L 1/003* (2013.01); *B60L 3/003* (2013.01); *B60L 3/0046* (2013.01);
(Continued)

(58) Field of Classification Search
CPC .... B60W 10/26; B60W 10/06; B60W 10/08; B60W 10/30; B60W 20/13; B60W 2510/244; B60W 2710/30; B60L 1/003; B60L 3/003; B60L 3/0046; B60L 3/04; B60L 7/12; B60L 11/005; B60L 11/14; B60L 11/1874; B60L 11/1877; B60L 2210/10; B60L 2240/421; B60L 2240/423; B60L 2240/545; B60L 2270/20; B60L 2240/662; B60L 2240/549; B60L 2240/547; Y10S 903/93; Y02T 10/7291; Y02T 10/70; Y02T 10/7216; Y02T 10/642; Y02T 90/16; Y02T 10/7022; Y02T 10/705; Y02T 10/7005; Y02T 10/7077
See application file for complete search history.

(56) References Cited

U.S. PATENT DOCUMENTS 5,811,895 A * 9/1998 Suzuki .................... H02J 9/061
307/116
6,784,563 B2 * 8/2004 Nada ................... F02N 11/0859
180/65.235
(Continued)

FOREIGN PATENT DOCUMENTS

| CN | 101415593 A | 4/2009 |
|---|---|---|
| CN | 101830223 A | 9/2010 |
| JP | 2004274945 A | 9/2004 |

OTHER PUBLICATIONS

WO/2014/005705 Bibliographic Data and Claims, Patentscope, May 2, 2016, 2 pages.*
(Continued)

*Primary Examiner* — Russell Frejd
(74) *Attorney, Agent, or Firm* — WRB-IP LLP

(57) ABSTRACT

A method for controlling a hybrid vehicle electrical system includes driving the vehicle in a first driving mode where the battery pack is connected to the traction voltage DC-link and the battery pack is supplying the electrical auxiliary units with power, shutting down the power electronics unit in order to cease power delivery from the electric machine to the traction voltage DC-link or to the electric machine from the traction voltage DC-link, disconnecting the battery pack from the traction voltage DC-link by opening the relay, and activating the power electronics unit and controlling output voltage of the power electronics unit to a predetermined level.

18 Claims, 3 Drawing Sheets

(51) Int. Cl.
*B60L 3/00* (2006.01)
*B60L 11/14* (2006.01)
*B60L 11/18* (2006.01)
*B60W 10/08* (2006.01)
*B60W 10/06* (2006.01)
*B60W 10/26* (2006.01)
*B60W 10/30* (2006.01)
*B60L 7/12* (2006.01)
*B60L 11/00* (2006.01)

(52) U.S. Cl.
CPC ............ *B60L 7/12* (2013.01); *B60L 11/005* (2013.01); *B60L 11/14* (2013.01); *B60L 11/1874* (2013.01); *B60L 11/1877* (2013.01); *B60W 10/06* (2013.01); *B60W 10/08* (2013.01); *B60W 10/26* (2013.01); *B60W 10/30* (2013.01); *B60W 20/13* (2016.01); *B60L 2210/10* (2013.01); *B60L 2240/421* (2013.01); *B60L 2240/423* (2013.01); *B60L 2240/527* (2013.01); *B60L 2240/545* (2013.01); *B60L 2240/547* (2013.01); *B60L 2240/549* (2013.01); *B60L 2240/662* (2013.01); *B60L 2270/20* (2013.01); *B60W 2510/244* (2013.01); *B60W 2710/30* (2013.01); *Y02T 10/642* (2013.01); *Y02T 10/70* (2013.01); *Y02T 10/705* (2013.01); *Y02T 10/7005* (2013.01); *Y02T 10/7022* (2013.01); *Y02T 10/7077* (2013.01); *Y02T 10/7216* (2013.01); *Y02T 10/7291* (2013.01); *Y02T 90/16* (2013.01); *Y10S 903/93* (2013.01)

(56) References Cited

U.S. PATENT DOCUMENTS

| | | |
|---|---|---|
| 8,120,200 B2 | 2/2012 | Walters et al. |
| 2002/0091470 A1 | 7/2002 | Sasazawa et al. |
| 2010/0109437 A1 | 5/2010 | Fattic |
| 2010/0225258 A1 | 9/2010 | Namuduri et al. |
| 2010/0236851 A1 | 9/2010 | Van Maanen et al. |
| 2012/0306263 A1* | 12/2012 | Tashiro ............... B60L 11/1868 307/9.1 |

OTHER PUBLICATIONS

Japanese Official Action (translation) (Feb. 29, 2016) for corresponding Japanese App. 2015-518896.
Chinese Official Action (Mar. 24, 2016) for corresponding Chinese App. 201380035454.6.
International Search Report (Aug. 20, 2014) for corresponding International App. PCT/EP2013/001953.

* cited by examiner

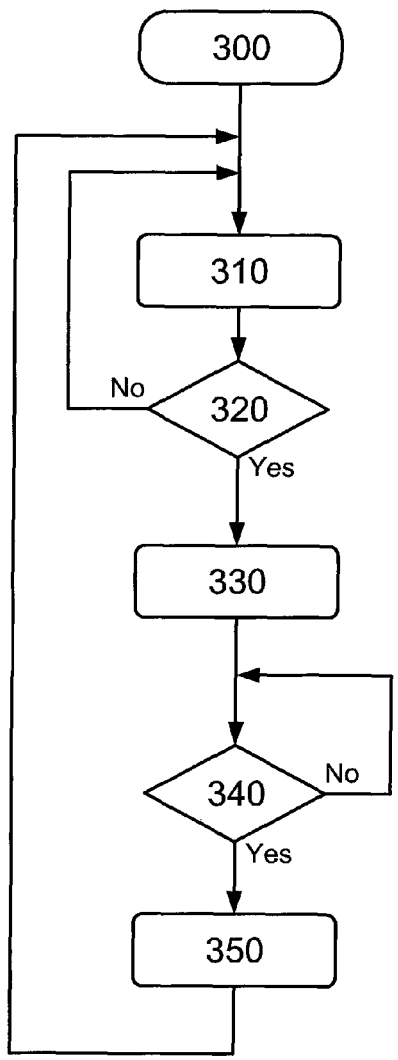
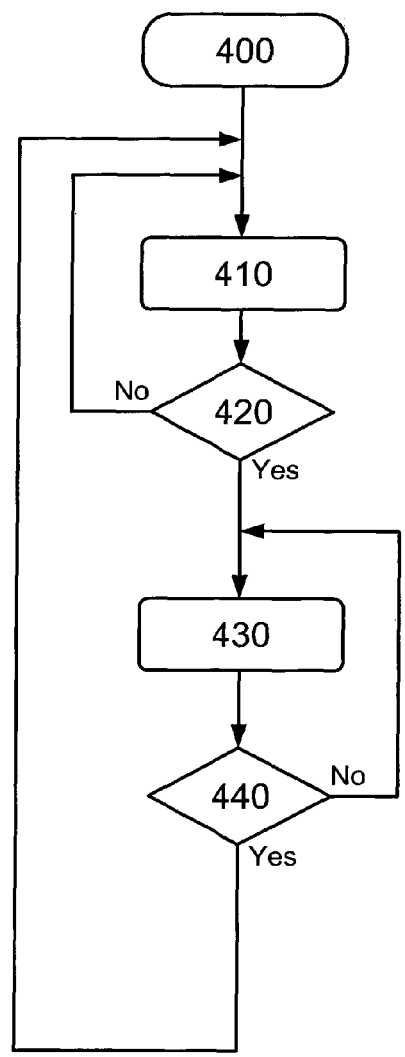
FIG. 3                    FIG. 4

US 9,428,060 B2

METHOD FOR CONTROLLING A HYBRID VEHICLE ELECTRICAL SYSTEM

BACKGROUND AND SUMMARY

The present invention relates to a method for disconnecting a battery in a hybrid electric vehicle, and further to a computer program and a computer program product for performing such a method.

A Parallel Hybrid Electrical Vehicle (Parallel HEV) configuration has an. engine, e.g. an Internal Combustion Engine (ICE), and an electric machine that together provide the necessary wheel, torque to drive the vehicle. Additionally, in the Parallel HEV configuration, the electric machine can be used as a generator to charge a battery pack from the power produced by the ICE. The is usually provided with a transmission between the ICE and drive wheels of the vehicle in order to be able to alter gear ratio between the ICE and the drive wheels and also in many cases between the electric machine and the drive wheels.

In a Parallel HEV comprising a hybrid electric powertrain with a combustion engine and an electric drive, the energy storage system (ESS) for the electric drive is essential. The function of the ESS is as an energy buffer so that an electric machine can be used both as a traction voltage alternator to charge the energy storage and as an electric motor to at least assist the combustion engine in the propulsion of the vehicle whereas the energy is taken from the ESS. The hybrid electric system operates at a traction voltage level, which can be typically 200-950V depending on the hybrid electric powertrain components and the system design.

The traction voltage in a Parallel HEV is not only used to power the vehicle through the electric machine, but is often also used to power electrical auxiliary units, some of which are essential for the vehicle's function.

Typical examples of essential electrical auxiliary units powered from the traction voltage are low voltage DC/DC converters used when the alternator is broken or when the capacity of the alternator is not enough, electric power steering that replaces a mechanically driven power steering driven by the powertrain, and electric air compressor that replaces a mechanically driven compressor driven by the powertrain. Without the function of these essential electric auxiliary units, the vehicle cannot be driven or has a very limited driving range.

A battery pack in an ESS is usually sensitive to temperature. The typical temperature operating range of a traction battery is between 0-50 degrees Celsius, where a good operation range can be limited to 10-40 degrees Celsius. A typical temperature operating range of a vehicle is −40-50 degrees Celsius. In the temperature range outside of the battery operating range, but within the vehicle operating range, the system cannot operate properly. This means that the powering of the essential auxiliary units may be interrupted and that the vehicle cannot be driven.

An ESS comprising a battery or a super capacitor is a complex electronic component that is added to the powertrain. The ESS is in itself a subsystem with a multitude of components: electronic, electric, chemical and/or mechanical components with functions for energy storage, monitoring, cooling and disconnection components. The added number of components and functions increase the risk of faults, which may have a negative impact on the vehicle operation since the ESS is essential for the operation of the vehicle.

In a Parallel HEV powertrain, the ESS is often designed with contactors to disconnect the ESS from the traction voltage DC-link in order to increase safety in a vehicle that is not operated. The traction voltage DC-link and its connected components will act as a large capacitor when an ESS, which is a voltage source, is connected to the traction voltage DC-link. A pre-charge circuit with a resistor can be used to obtain a controlled charging of the traction voltage DC-link before connecting the ESS. Otherwise, upon connection, a large current will flow through the contactors into the traction voltage DC-link which may damage the contactors. The pre-charge circuit is a part of the ESS, but it is only necessary when connecting the ESS to the traction voltage DC-link. After a pre-charge is completed, the pre-charge circuit will be passive until the next connection of the ESS to the traction voltage DC-link. A fault in the pre-charge circuit will lead to that the ESS cannot be connected to the traction voltage DC-link which in turn means that the vehicle cannot be operated.

A known solution to keep the battery in an operable state is to keep the battery within its operating temperature range by e.g. parking indoors in a temperate surrounding, or by connecting an external heater e.g. to the battery coolant system that continuously can maintain the battery temperature within battery temperature limits.

U.S. Pat. No. 8,120,200 discloses a hybrid vehicle provided with a failsafe backup mode in case of disconnection of the battery pack (20). If the battery pack is disconnected, e.g. due to an over temperature, the current supplied from the battery is reduced to zero and the electric machine (18) will start to function as a generator for supplying power to the loads (38) of the vehicle. The vehicle is provided with an auxiliary battery (40) which is also connected to the loads. In this way, the loads will still be supplied with current even if there is a short interruption of power when the battery is disconnected and the electric machine starts to deliver current.

It is desirable to provide an improved method for disconnecting the battery when needed.

It is desirable to provide an improved method for disconnecting a battery from a traction voltage DC-link in a hybrid vehicle.

In a method for controlling a hybrid vehicle electrical system comprising one or more electrical auxiliary units, a combustion engine driven electric machine operable as a generator for supplying power to said electrical auxiliary units via power electronics unit and via a traction voltage DC-link, a high voltage battery pack coupled to the traction voltage DC-link by a relay that can be opened to disconnect the battery pack from the high voltage DC-link under fault conditions, the method comprises the steps of.

driving the vehicle in a first driving mode where the battery pack is connected to said traction voltage DC-link and the battery pack is supplying the electrical auxiliary units with power, upon receiving a first indication that said battery pack has to be disconnected, and upon receiving also a second indication that the vehicle is in a predetermined vehicle condition, then shutting down the power electronics unit in order to cease power delivery from the electric machine to the traction voltage DC-link or to the electric machine from the traction voltage DC-link, disconnecting the battery pack from the traction voltage DC-link by opening the relay, and then activating the power electronics unit and controlling output voltage of the power electronics unit to a predetermined level, as long as the electric machine is rotating and supplying power through the power electronics unit to the traction voltage DC-link in order to resume operation of said electrical auxiliary units.

By this first embodiment of the method, the method can control the electrical system of a hybrid vehicle, where the electrical system comprises one or more electrical auxiliary units and a battery, pack, such that the battery pack can be disconnected from the traction voltage DC-link of the vehicle in a controlled way, and that the operation of the auxiliary units can be continued after the battery pack has been disconnected. When the battery pack has been disconnected, the auxiliary units are powered by the electric machine acting as a generator. The electric machine is connected to the traction voltage DC-link through a power electronics unit adapted to control the output voltage of the power electronics unit to a predetermined level.

The electrical auxiliary units are preferably shut off before the battery pack is disconnected from the traction voltage DC-link, especially if the electrical auxiliary units are high power units. The advantage of shutting down high current loads before the battery pack is disconnected is to avoid surge currents during the disconnection.

The disconnection of the battery pack is initiated by an indication that the battery pack has to be disconnected. Such an indication may be e.g. a low external temperature, a too low or too high battery temperature, a faulty battery, a too high voltage of the battery or a faulty battery charger. Further, the disconnection of the battery is preferably also initiated by an indication of a vehicle condition. Such a vehicle condition may e.g. be that the combustion engine is running, and that the vehicle is either standing still or travelling forwards.

In a development of the inventive method, the predetermined vehicle condition is a condition where it has been secured that the auxiliary electrical units can be temporarily disconnected. A control unit of the vehicle can be programmed to monitor different auxiliary electrical units in the vehicle so that they are temporarily not used and therefore can be temporarily disconnected. If the current load of the electrical auxiliary units is low, e.g. below 20 A or 10 A, the surge current will be relatively low which means that the electrical auxiliary units do not have to be shut off before they are disconnected. Different sensors in the vehicle can be used in order to determine the prevailing vehicle condition and also coming vehicle conditions. The time span can be up to a few seconds, i.e. during the duration of the temporary disconnection of the different electrical auxiliary units.

If a driver during the temporary disconnection of the different electrical auxiliary units indicates that a functionality from one of said different electrical auxiliary units is needed, the control unit can be programmed to postpone the use of the electrical auxiliary unit until the power electronics unit has been activated again after the disconnection of the battery pack in order to control the output voltage of the power electronics unit to a predetermined level, in order to resume the operation of said electrical auxiliary units.

In a further development of the method, the electrical auxiliary units are at least one of a DC/DC converter from the DC-link voltage to 12/24V, electric power steering, an electric air compressor, an electric air condition or an electric compressor.

The advantage of the invention compared to prior art U.S. Pat. No. 8,120,200 is that no extra battery is needed in order to provide power during the time the main battery pack is disconnected. In this way a simpler and cheaper solution can be provided.

BRIEF DESCRIPTION OF DRAWINGS

The invention will be described in greater detail in the following, with reference to the attached drawings, in which FIG. 3 shows a further schematic flow chart of an inventive method, and FIG. 4 shows a further schematic flow chart of an inventive method.

DETAILED DESCRIPTION

The embodiments of the invention with further developments described in the following are to be regarded only as examples and are in no way to limit the scope of the protection provided by the claims.

Figure 1:
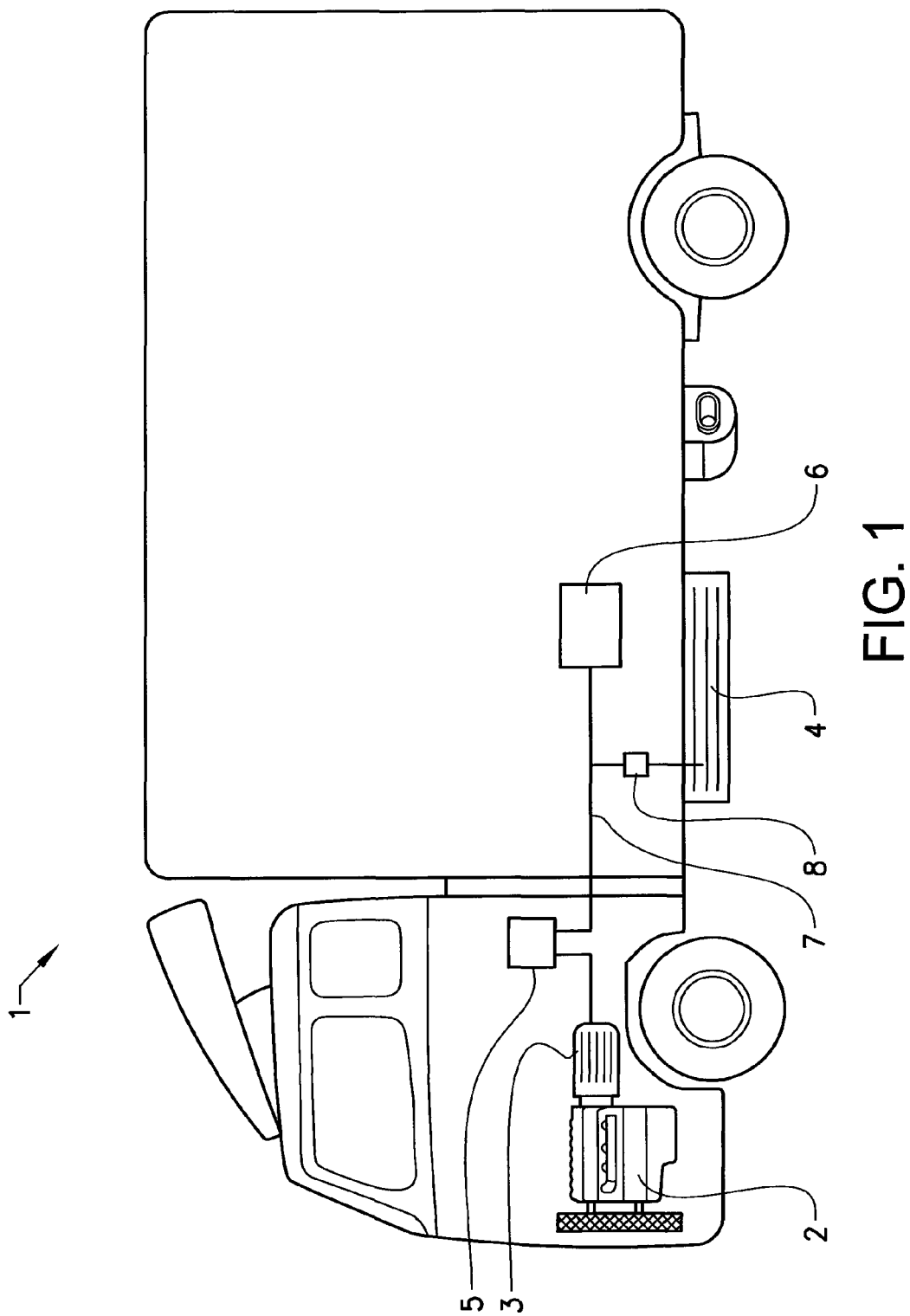
FIG. 1 shows a schematic hybrid vehicle comprising a vehicle system.

FIG. 1 shows a schematic parallel hybrid electrical vehicle (Parallel HEV) 1, here shown as a delivery truck. The hybrid vehicle may be a regular hybrid vehicle or a plug-in hybrid vehicle. Other types of heavy hybrid vehicles such as busses, refuse vehicles, wheel loaders etc. can also be used with the inventive method. The hybrid vehicle is provided with a combustion engine 2, normally a diesel engine but other types of fuels, such as liquefied natural gas or compressed natural gas, can of course also be used. The hybrid vehicle is also provided with an electric machine 3 connected to the engine 2. The electric machine is preferably positioned close to the engine but can also be placed apart from the engine, e.g. at the drive axle of the vehicle. The electric machine may also be integrated between the engine and the gear box of the powertrain.

The electric machine can be used in a drive mode where it is used as an electric motor to power the vehicle. In the drive mode, it receives current from the battery 4. The battery is a high voltage battery having a voltage in the range of 200-950 volts. The battery voltage is referred to as the traction voltage DC-link. Depending on the type of hybrid vehicle, the electrical motor can either complement the combustion engine when extra power is needed, e.g. at starts, accelerations and upwards slopes, or it can power the complete vehicle when the combustion engine is shut off.

The electric machine can also be used in a brake mode where it regenerates energy to the battery when the vehicle retards. During retardation, the electric machine is used as an electric brake and the energy can be used to recharge the battery. The electric machine can also be used as a regular generator that charges the battery when the vehicle is powered by the combustion engine and when the electric machine is not used in the drive mode. The electric machine can be a permanent magnet electrical motor.

The vehicle is further provided with a power electronics control unit 5 which comprises a battery management function that controls the power flow to and from the battery depending on instructions received from the vehicle control system, such as requested acceleration, requested speed or requested brake power. The power electronics control unit is also provided with measurement functions that can collect measurements from other electronic control units (ECU) in the vehicle. The ECUs communicate over a local data bus and may control different functions of the vehicle, such that one or more dedicated ECUs control the combustion engine, one ECU controls the gearbox, one ECU controls the lights etc. Each ECU can send measurements through the data bus to the control unit 5. The power electronics control unit 5 may be a stand-alone unit or may be integrated in another control unit.

The vehicle is further equipped with a plurality of electrical auxiliary units 6 powered by the high voltage traction voltage DC-link 7. Examples of an electrical auxiliary unit are e.g. a DC/DC converter that converts the high voltage to 12 or 24 volts, an electric power steering, an electric air compressor, an electric air condition system or an electric compressor.

The electric machine and its power electronics can be used as a power supply for the auxiliary units by controlling the power electronics control unit to supply a fixed output voltage to the DC-link. In this way, the auxiliary units may be supplied from the DC-link when the battery is disconnected and the engine is running. The control mode of an electric machine in a parallel hybrid powertrain is conventionally torque control but may also be speed control.

In one example, when the battery temperature is outside the allowed operating range of the battery, e.g. at cold starts, the battery will not be connected to the traction voltage DC-link. Instead the electric machine is controlled to work in a voltage control mode, i.e. the combustion engine runs, and propels the vehicle with the conventional powertrain, and the electric machine is used as a generator where the power electronics control unit regulates the output voltage to the voltage of the traction voltage DC-link. This facilitates the operation of any present essential electric auxiliary unit since there will not be a need for an extra low voltage converter to power the electrical auxiliary units. Further, the electric machine will secures the supply to the 12 or 24 volts network via a DC/DC-converter. In this way, a separate low voltage generator that supplies the 12 or 24 volts system is not required.

The provided voltage may not be continuous, since it may be subjected to short interrupts. If the electric machine is connected to the transmission input shaft, the electric machine must be stopped to engage the start gear. The voltage can be supplied again when the electric machine reaches some speed, which corresponds to a rather low vehicle speed. Further, during a gearshift the driveline must be unloaded to change gears and during this short time the voltage supply may be interrupted. It is possible to design the essential electric auxiliary units such that they can handle short traction voltage drops, which means that the vehicle is drivable without the battery in operation.

It is important that the electrical auxiliary units can handle a power shortage without damage. One possibility is to incorporate a small energy buffer, e.g. a capacitor, which will allow a few second of power shortage. During a longer power shortage when a unit is shut off in an uncontrolled way, a proper shut-off sequence of the unit cannot be guaranteed. By incorporating a small energy buffer, a proper shut-off sequence of the unit can be guaranteed. It is also possible to design a unit such that it can be shut off by removing the supply voltage without a proper shut-off sequence.

It is also important that the power electronics control unit can handle a power shortage without damage. The power electronics control unit must be able to shut off in an uncontrolled way, and must further be able to restart without being connected to the traction voltage DC-link. One possibility is to connect the power electronics control unit to the low voltage system, i.e. the 24 volt system, of the vehicle, such that it can use the low voltage to restart. It is also possible to include a circuit that is connected directly to the electric machine and uses that voltage to restart. It would also be possible to incorporate a small energy buffer, e.g. a capacitor, which will provide enough energy to restart.

The inventive solution can be regarded as a backup function that replaces a connected energy storage system (ESS) in the form of a battery pack when needed. Under normal vehicle operating conditions, the function is normally not active.

During normal operating conditions, different parameters such as battery temperature and the state of components are continuously checked to determine whether to activate the voltage control. If the ESS needs to stay disconnected, e.g. at power-up, or needs to be disconnected, e.g. due to a fault, the voltage control will be activated.

In voltage control, the voltage from the electric machine is controlled to a predetermined voltage level by the power electronics control unit and is supplied to the traction voltage DC-link. The predetermined voltage level is preferably the same as the voltage supplied by the battery pack, i.e. the voltage of the traction voltage DC-link when the battery is connected, but it may also vary some from this level, depending e.g. on the ambient temperature.

Before the voltage control mode is entered, i.e. before the battery pack is disconnected from the traction voltage DC-link of the vehicle, the electrical auxiliary units are preferably shut off. The advantage of shutting down high current units before the battery pack is disconnected is to avoid surge currents during the disconnection. If the electrical auxiliary units are low power units, e.g. with a total current rating of less than 20 ampere or more preferred less than 10 amperes, they may not have to be disconnected since the surge current when they are connected will be relatively low. However, it is of advantage to always shut off all the electrical auxiliary units.

The disconnection of the battery pack is initiated by an indication that the battery pack has to be disconnected. Such an indication may be e.g. a low external temperature, a too low or too high battery temperature, a faulty battery, a too high voltage of the battery or a faulty charge electronic. Further, the disconnection of the battery is preferably also initiated by an indication of a vehicle condition. Such a vehicle condition may e.g. be that the combustion engine is running, and that the vehicle is either standing still or travelling forwards.

The voltage control allows the vehicle to be driven, but the performance of the traction voltage supply may be somewhat limited. The function may have interrupts in the traction voltage supply during e.g. take-off or marshalling when the speed of the electric machine is fixedly related to the vehicle speed and when this speed is too low to allow the electric machine to operate as a generator with voltage control, and during gear-shifts when the powertrain must be unloaded to shift the gears. The traction voltage supply may also be interrupted during automatic brake system interventions or during re-enabling of the electric propulsion system (EPS) system to normal operation. When the traction voltage supply is interrupted, the DC/DC converter that charges the 24V supply is also interrupted. However, the 24 volts battery will continue to supply the 24 volt system with uninterrupted power.

In order to activate voltage control, the powertrain control system requests voltage control from the power electronics control unit. At the same time, the diesel engine and transmission are requested to operate as a conventional powertrain, i.e. no stopping of the engine, gearbox synchronization by means of engine and clutch control etc. When voltage control is active, the possibility to connect or reconnect the ESS is continuously evaluated. It is typically possible to connect or reconnect the ESS when there is no ESS fault that prevents the contactor to be closed, or when the long term ability for charge or discharge of the ESS is large enough.

Preferably, the control system also checks if a predetermined vehicle condition is prevailing where it can be secured that the electrical auxiliary units can be temporarily disconnected in order to reconnect the ESS. Such a vehicle condition may be that the combustion engine is running, that the vehicle is standing still or that the vehicle is travelling forwards.

If the system detects that it is possible to reconnect the ESS, the reconnection must be done in a controlled way, in order not to damage the EPS components. This includes disabling of all. EPS components and performing a clean start-up or reset of the EPS system. The request for voltage control is withdrawn and the power electronics control unit, the DC/DC converters and other electrical auxiliary units are disabled. After that, the ESS is requested to perform a pre-charge and then to reconnect, which is done by closing the contactor. Thereafter, the power electronics control unit, the DC/DC converters and the other electrical auxiliary units are enabled, after which the system can operate normally again. Such a re-connection will interrupt the traction voltage supply for a few seconds.

Figure 2:
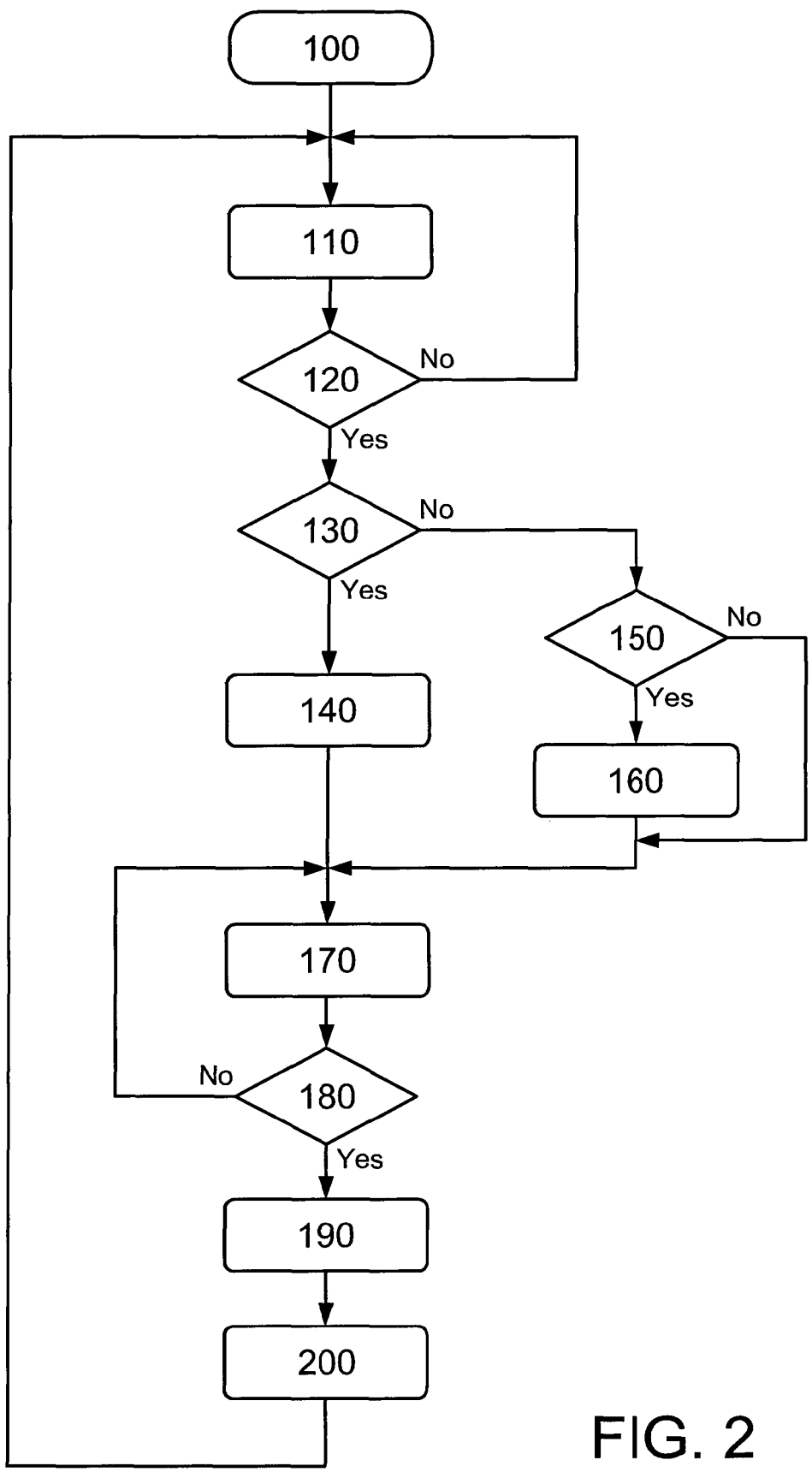
FIG. 2 shows a schematic flow chart of an inventive method.

A reconnection of the ESS will not be done if a fault caused the system to enter voltage control, i.e. when a restart or reset is needed to come back to the normal state. An example of a normal reconnection operation can be seen in FIG. 2, which shows a schematic flow chart of a method for controlling a hybrid vehicle electrical system. The method steps are preferably performed by a computer program and a computer program product contained and run in the electronic control system of the vehicle.

The method starts in step 100, where the vehicle is started and the system is initialized. In step 110, the vehicle electrical system will assume a normal operating state, with the battery pack connected to the traction voltage DC-link. As long as no fault occurs, the system will continue to operate in the normal state.

In step 120, the system checks if the battery pack should be disconnected, or if the battery pack should continue to be disconnected if it is disconnected. In those cases, the system should be run in voltage control mode. If the battery pack is functioning and no fault is detected, the normal operating state continues.

If the battery pack is disconnected or should be disconnected, the method continue with step 130, where the system checks if the high voltage electric system is at a power up mode. If it is, the method continues with step 140, in which the electric system will be started without the battery pack connected to the traction voltage DC-link by requesting voltage control mode in step 170.

If the electric system is already running, the method continues with step 150, where the system checks if the battery pack is connected to the traction voltage DC-link. If the battery pack is connected, the electric propulsion system and the electrical auxiliary units are shut down and thereafter, the battery pack is disconnected from the traction voltage DC-link by opening the relay. A voltage control mode will then be requested in step 170. If the battery pack is already disconnected, voltage control mode in step 170 is requested.

In step 170, voltage control mode is requested. At the same time, the vehicle will be powered only by the combustion engine and the electric machine will run as a generator.

In step 180, the system checks if the battery pack can be reconnected. If the cause for the disconnection remains, e.g. due to low temperature of the battery pack, the battery pack cannot be connected and the vehicle continues to run in a voltage control mode.

If the battery pack can be reconnected, e.g. when the temperature of the battery pack is within the operational range, the method continues with step 190, where the traction voltage DC-link is pre-charged and the battery pack is connected to the traction voltage DC-link by closing the relay, In step 200, the electrical auxiliary units are activated and normal operation is requested. The vehicle will then continue to run in the normal operational mode until a fault occurs, which calls for a disconnection of the battery pack.

An example of how a specific fault is handled when the vehicle is operating in a voltage control mode, here a fault with a too high traction voltage is shown in FIG. 3. There are different reasons for a high voltage fault to occur, which leads to spontaneous disabling of the power electronics control unit, the DC/DC converters and other electrical auxiliary units. When they are disabled and the cause of the fault has disappeared, it is possible to re-enable the power electronics control unit, the DC/DC converters and the other electrical auxiliary units. The purpose of this fault handling is to increase system uptime during voltage control.

The method starts in step 300 and the vehicle is in this example running in voltage control mode in step 310.

In step 320, the system checks if the traction voltage of the DC-link is too high. If the traction voltage is normal, i.e. below a predefined set value, the vehicle continues to run in the voltage control mode. If the traction voltage is too high, the method continues with step 330, where the electric propulsion system and the electrical auxiliary units are shut down.

In step 340, the system checks if the traction voltage of the DC-link is still too high. If the traction voltage is below the predefined set value, the voltage is considered to be normal, and the method continues with step 350, where the electric propulsion system and the electrical auxiliary units are enabled again. The vehicle will then continue to run in the voltage control mode. If the traction voltage is above the predefined set value, the electric propulsion system and the electrical auxiliary units continue to be shut down.

In the FIG. 4, another specific fault shows how a traction voltage interruption at gearshift or start of the vehicle is handled. When a transmission in the form of an automatic manual transmission (AMT) without counter-shaft brake is used, the voltage control mode can provide a braking torque on the in-shaft of the transmission to improve the engagement of the start gear and of the up-shift gear synchronization. The electric machine will function as a generator and will provide a braking torque which may help to maintain the traction voltage. This braking torque can somewhat substitute for the removed counter shaft brake. One problem that may occur is that an air compressor powered from the traction voltage DC-link will not operate continuously.

The method starts in step 400 and the vehicle is in this example running in voltage control mode in step 410.

In step 420, the system checks if a gear shift is taking place or if a gear is engaged at a low vehicle speed. If not, the system continues to operate in a voltage control mode in 410, or the system may check for other faults, such as an over voltage of the traction voltage as in step 320.

If a gear shift is taking place or if a gear is engaged at a low vehicle speed, the voltage control mode is temporarily interrupted in step 430.

In step 440, the system checks if the gear shifting is still taking place or if a start of the vehicle is completed. If not, the voltage control mode will continue to be temporarily interrupted and the system continues to check this. If the gear shifting or the take off is completed, the system continues to operate in a voltage control mode in step 410.

There are several advantages of the inventive method using a voltage control. One advantage is that since the traction voltage is generated from the powertrain components. i.e. from the electric machine acting as a generator, without the battery pack being connected to the traction voltage DC-link, it is possible to drive the vehicle without a functioning battery pack. One example is when the battery temperature is too low when the vehicle is to be cold started. With the described voltage control, the vehicle can be started and can continue to drive without the battery pack being connected to the traction voltage DC-link. The battery pack can be heated during driving and can be connected to the traction voltage DC-link when it is warm enough. In this way, the powertrain is operational without the traction battery pack, which leads to that the voltage control increases the robustness and the limp ability for the vehicle when a fault on the traction battery pack occurs.

In one example, the vehicle is driving only on electricity by using the electric machine as a motor, where the power is supplied from the traction voltage DC-link by the battery pack. Such a situation may e.g. occur when the vehicle is driven in an environmental zone in an inner city. The electrical auxiliary units are also powered from the traction voltage DC-link. If the voltage of the battery pack drops, e.g. because of discharge or due to a fault, the control system receives a signal requesting a disconnection of the battery pack. When the signal is received, it is required to start the engine and to drive the vehicle only by the engine and to power the electrical auxiliary units by the electric machine used as a generator. Thus, the engine is started, either by using a starter motor or by a roll start using the moving momentum of the vehicle. At the same time, the electrical auxiliary units are shut down and the battery pack is disconnected by opening the relay. When the battery pack is disconnected, the power electronics unit is activated in the voltage control mode, regulating the voltage of the traction voltage DC-link to a predefined voltage level. When the voltage level is stable, the electrical auxiliary units can be activated to resume their operation.

Another advantage is that if a fault in the pre-charge circuit of the ESS occurs, the voltage control can be used to pre-charge the traction voltage DC-link so that the ESS contactors can be closed without risk of damaging surge currents.

A further advantage is that when a transmission in the form of an AMT without counter-shaft brake is used, the voltage control mode can provide a braking torque on the in-shaft of the transmission to improve the engagement of the start gear and of the up-shift gear synchronization.

The invention is not to be regarded as being limited to the embodiments described above, a number of additional variants and modifications being possible within the scope of the subsequent patent claims.

REFERENCE SIGNS

1: Vehicle
2: Combustion engine
3: Electric machine
4: Battery
5: Power electronics control unit
6: Electrical auxiliary units
7: Traction voltage DC-link
8: Relay

The invention claimed is:

1. Method for controlling a hybrid vehicle electrical system comprising one or more electrical auxiliary units, a combustion engine driven electric machine operable as a generator for supplying power to the electrical units via a power electronics unit and via a traction voltage DC-link, and a high voltage battery pack coupled to the traction voltage DC-link by a relay that can be opened to disconnect the battery pack from the high voltage DC-link under fault conditions, the method comprising:
   driving the vehicle in a first driving mode where the battery pack is connected to the traction voltage DC-link and the battery pack is supplying the electrical auxiliary units with power,
   upon receiving a first indication that the battery pack has to be disconnected, and upon receiving also a second indication that the vehicle is in a predetermined vehicle condition, then
   shutting down high current electrical auxiliary units powered from the traction voltage DC-link,
   shutting down the power electronics unit in order to cease power delivery from the electric machine to the traction voltage DC-link or to the electric machine from the traction voltage DC-link,
   disconnecting the battery pack from the traction voltage DC-link by opening the relay, and then
   activating the power electronics unit and controlling output voltage of the power electronics unit to a predetermined level, as long as the electric machine is rotating and supplying power through the power electronics unit to the traction voltage DC-link in order to resume operation of the electrical auxiliary units.

2. Method according to claim 1, wherein all the electrical auxiliary units are shut off before the battery pack is disconnected from the traction voltage DC-link.

3. Method according to claim 1, wherein the predetermined vehicle condition being that the combustion engine is running.

4. Method according to claim 1, wherein the predetermined vehicle condition being the vehicle standing still.

5. Method according to claim 1, wherein the predetermined vehicle condition being the vehicle travelling forwards.

6. Method according to claim 1, wherein the predetermined vehicle condition is a condition where it has been secured that the auxiliary electrical units can be temporarily disconnected.

7. Method according to claim 1, wherein the auxiliary electrical units are at least one of a DC/DC converter to 12/24V, electric power steering, an electric air compressor, an electric air condition or an electric compressor.

8. Method according to claim 1, wherein the electric machine is rotated by the combustion engine during all the method steps.

9. Method according to claim 1, wherein the first indication comprising the battery being outside its operational temperature range.

10. Method according to claim 9, wherein the temperature range is 0 to 50 degrees Celsius.

11. Method according to claim 1, wherein the first indication comprising predicting that the battery is in a battery life shortening condition, and therefore has to be disconnected.

12. Method according to claim 1, wherein the first indication comprising, that the ambient temperature is outside of a predetermined temperature range.

13. Method according to claim 12, wherein the temperature range is −20 to 40 degrees Celsius.

14. Method according to claim 1, wherein the first indication comprising that the battery pack is faulty.

15. Method according to claim 1, wherein the first indication comprising that the traction voltage is above a predetermined voltage level.

16. Vehicle comprising control means for performing a method according to claim 1.

17. A computer programmed for performing all the steps of claim 1.

18. A computer program product comprising a computer program stored on a non-transitory computer readable medium for performing all the steps of claim 1 when the program product is run on a computer.

\* \* \* \* \*